United States Patent
Al Shehadat

(10) Patent No.: US 11,801,119 B2
(45) Date of Patent: Oct. 31, 2023

(54) NEEDLE FOR EXTRACTING ENDODONTIC SEPARATED INSTRUMENTS

(71) Applicant: University of Sharjah, Sharjah (AE)

(72) Inventor: Saaid Ayesh Al Shehadat, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 48 days.

(21) Appl. No.: 16/169,267

(22) Filed: Oct. 24, 2018

(65) Prior Publication Data

US 2020/0129268 A1    Apr. 30, 2020

(51) Int. Cl.
*A61C 5/46*  (2017.01)

(52) U.S. Cl.
CPC ..................... *A61C 5/46* (2017.02)

(58) Field of Classification Search
CPC .... A61C 5/46; A61C 5/42; A61C 5/40; A61C 5/00
USPC ........................................ 433/224
See application file for complete search history.

(56) References Cited

U.S. PATENT DOCUMENTS

| | | | |
|---|---|---|---|
| 2006/0034769 A1* | 2/2006 | Kohn | A61L 31/148 424/9.45 |
| 2008/0050696 A1* | 2/2008 | Lewis | A61C 5/46 433/141 |
| 2016/0095679 A1* | 4/2016 | Khakpour | A61C 17/20 433/81 |

FOREIGN PATENT DOCUMENTS

WO    WO-2008023358 A1 *   2/2008   ............... A61C 5/46

* cited by examiner

*Primary Examiner* — Ralph A Lewis
*Assistant Examiner* — Mirayda A Aponte
(74) *Attorney, Agent, or Firm* — Hayes Soloway PC

(57) ABSTRACT

There is provided a needle tip for extracting separated endodontic instruments from the root canal of a tooth. The needle tip is fabricated with a thermomechanically treated alloy exhibiting both shape memory and super-elasticity. There is also provided for a needle that includes a handle and a terminal tip, which is fabricated with a thermomechanically treated alloy. The alloy is thermomechanically treated nickel- titanium alloy. The needle is straight at room temperature and takes on a specific shape when inserted in the canal of the tooth from which the endodontic separated instrument is to be extracted. Also provided herein is a method for removal of endodontic separated instruments from the canal of a tooth.

16 Claims, 8 Drawing Sheets

NEEDLE FOR EXTRACTING ENDODONTIC SEPARATED INSTRUMENTS

FIELD OF THE INVENTION

The present invention relates to the field of endodontics and more particularly relates to a needle for extracting pieces of endodontic instruments, which were separated in a root canal during a root canal therapy.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

In the early days of dentistry, the only way to treat an infected tooth was by extracting the tooth. In recent times, endodontists have successfully learned to remove the infected pulp material from the nerve of the tooth. This treatment is commonly known as a root canal treatment. A "root canal" is the term used to describe the natural cavity within the center of the tooth. The pulp or the pulp chamber is the soft area within the root canal and the tooth's nerve lies within the root canal. A root canal treatment is used to repair and save a tooth that is badly decayed or becomes infected. During a root canal treatment, the dentist carefully removes the infected pulp inside the tooth, cleans, disinfects and shapes the root canals, and places a filling to seal the space to prevent further infection.

One of the most important steps in a root canal treatment is the preparation of the canal. Cleaning and shaping of the root canal can be achieved using hand or rotary instruments. Presently preferred material used for making of endodontic instruments are stainless steel alloys or elastic alloys such as nickel-titanium (NiTi) alloy. Rotary nickel-titanium (NiTi) endodontic instruments are now commonly used to prepare root canals. Several studies have reported the ability of rotary NiTi to produce well-centered, smooth, minimally transported canals while minimizing procedural errors. NiTi instruments are sub-divided into instruments that mainly contain the Austentite phase (conventional NiTi, M-wire, R-phase) and those mainly containing the Martensite phase (CM wire, Gold and Blue heat-treated NiTi).

Although NiTi instruments exhibit a high amount of flexibility and elasticity with an increased torsional fractional resistance, fracturing or breaking of these instruments in the canal of the tooth remains an inadvertent incident during clinical use. Fracture of NiTi instruments occure in two ways: one due to torsional failure and the other as a reason of cyclic fatigue. This mishap impedes the suitable cleaning of the root canal, thus leading to failure of the endodontic treatment. Instrument fractures during root canal treatment hinder the clinician from optimal preparation and obturation of the entire root canal system. This affects the long term prognosis of root canal treatment negatively In some scenarios, leaving the broken instruments in the canal of the tooth can result in serious complications and in the end may require extraction of the tooth. Particularly, most of these broken instruments are either files, bore or cutting instruments that break during the root canal procedure and get embedded in the tooth causing severe pain to the patient post the treatment. Based on different studies, the mean prevalence of the retained fractured endodontic instruments ranges between 1.0% for rotary Ni—Ti instruments to 1.6% for mostly stainless steel instruments.

Management and/or removal of broken instruments is a strenuous procedure in the field of dentistry. Management of a broken instrument requires an orthograde or a surgical approach. The three orthograde approaches are (a) attempt to remove the instrument; (b) attempt to bypass the instrument; and (c) prepare and obturate to the fractured segment.

In most cases, removal of broken instruments from the root canal is difficult and often hopeless. To date, no standardized procedure for the safe removal of fractured instruments exists, although various techniques and devices have been used in the past. These techniques have shown only limited success, while often causing considerable damage to the remaining root. Complications because of these techniques include excessive loss of root canal dentin, ledging, perforation, and extrusion of the fractured instrument fragment through the apex. Therefore, many techniques cannot be used in narrow and curved canals. Over the years, different techniques have been proposed for the removal of separated instruments from root canals.

Over the years, retrieval of the broken endodontic instruments is tried under magnification (microscope) using ultrasonic specific tips. In this method, the first step includes exposing the tip of the broken endodontic instrument and loosening it by removing dentine all around it. It must be noted that root canals are seldom straight and often have bends and twists thereby making it difficult for removal of broken endodontic fragments.

Short fragments in straight root canals may be removed by ultrasonic activation only. However, removal of longer fragments (usually more than 4.5 mm) or endodontic instruments broken in curved canals by ultrasonic activation is not recommended as it results in extra removal of dentine, which in turn makes the tooth weak in structure. In such cases, the usage of additional tools is needed to securely capture the tip of the fragment and withdraw it out of the canal. Some of current tools used for this purpose include: Terauchi loop, instrument removal system iRS (Dentsply Tulsa Dental; Tulsa, Okla.), File removal system kit (Dentsply Sirona; USA), Masserann kit (Micro☐Méga, Besançon, France) and Ruddle Post Removal System (SybronEndo; Orange, Calif.).

However, all previous instruments have certain clinical limitations. From clinical experience, the Terauchi loop is very fragile, expensive and difficult to manipulate once inserted in the root canal of the tooth making it very difficult for extracting the broken endodontic instruments especially from curved root canals. The other tools also consist of two units that should be used together and this limits their use especially in the curved part of the canal.

Conventional NiTi endodontic instruments straighten within a curved root canal which results in a lateral force upon the root canal wall. To minimize this lateral force and ensure great flexibility there is a need for development of an instrument, that exhibits both advanced flexibility and superelasticity.

Success of fractured instrument removal from root canals depends on the canal anatomy, the location of the fragment in the canal, the length of the separated fragment, the diameter and curvature of the canal itself, and the impaction of the instrument fragment into the canal wall. 7 Instruments located in the straight portions of the canal can usually be removed. If separated instruments lie partially around canal curvatures and straight line access is prepared to the coronal of the fractured instrument segments, they can be removed. The removal of the broken instrument segments that are apically located to the curvature of the canal is usually not possible. The failure of using a conventional endodontic instrument in curved roots, has contributed to a lack of success in removing fractured instruments.

Thus, there is a need of developing an optimal, flexible, super-elastic and cost-effective instrument which can effectively extract broken endodontic fragments from curved root canals.

SUMMARY OF THE INVENTION

Therefore, it is an object of the present invention to provide for a simple, flexible, fatigue-resistant and cost effective instrument which is capable of effectively retrieving broken endodontic instruments from the root canals, irrespective of the canal being straight or curved.

It is also an object of the present invention to provide for an instrument that can contract and expand as per the canal morphology, thereby being able to access areas in the canal which conventional endodontic instruments could not access.

It is also an object of the present invention to provide for an instrument that can adapt to canal irregularities and has excellent resistance to cyclic fatigue.

The present invention, is directed to a needle tip for extracting an endodontic separated instrument from a root canal of a tooth wherein said tip is fabricated with a temperature-sensitive alloy; and wherein said tip takes a specific shape in the canal from which the endodontic separated instrument is to be removed when the tip is inserted inside the canal.

In an embodiment, said needle tip is adapted to change shape to become straight at a room temperature of 25° C. or less.

In an embodiment, said needle tip is adapted to change shape to become curved at a body temperature of 37° C. or more.

In a further embodiment, the alloy fabricating the needle tip is thermomechanically treated.

In a preferred embodiment, the alloy is a thermomechanically treated nickel-titanium alloy.

The present invention, is directed to a needle for extracting endodontic separated instruments from a root canal of a tooth. The needle comprises a gripping handle portion, a terminal tip being insertable within a root canal of a tooth, wherein said tip is fabricated with a temperature-sensitive alloy, wherein said alloy is temperature-sensitive, and wherein said tip takes a specific shape in the canal from which the endodontic separated instrument is to be removed.

In an embodiment, the terminal tip of the needle has a diameter in the range of 0.25 mm-1 mm.

In another embodiment, the shape of the terminal tip of the needle is adapted to change shape to become straight at room temperature. In a preferred embodiment, room temperature is any temperature, which is not more than 25° C.

In an embodiment, the shape of the terminal tip of the needle is adapted to change shape to become curved at body temperature. In a preferred embodiment, body temperature is any temperature, which is at least 37° C. In a preferred embodiment, the curved shape of the needle is a snake-like shape.

In an embodiment, the terminal tip of the needle has a diameter greater than the diameter of the endodontic separated instrument.

In an embodiment, the needle to extract the endodontic separated instrument is fabricated with a thermomechanically treated alloy.

In another embodiment the alloy is thermomechanically treated nickel-titanium alloy. In a preferred embodiment, the thermomechanically treated nickel-titanium alloy comprises nickel and titanium in an equiatomic ratio.

In an embodiment, the balance of the thermomechanically treated nickel-titanium alloy consists essentially of nickel.

The present invention is also directed to a method for removal of a endodontic separated instrument from a root canal of a tooth. The method for removal comprises enlarging the canal coronal to the endodontic separated instrument, exposing the upper end of the endodontic separated instrument using an ultrasonic tip, inserting the terminal tip of the needle fabricated with a temperature-sensitive alloy into the canal of the tooth to engage the upper end of the endodontic separated instrument, injecting a hot irrigant in the canal of the tooth causing the terminal tip of said needle to change to a curved shape thereby securely engaging the upper end of the separated instrument and removing the endodontic separated instrument along with the needle from the canal of the tooth.

In an embodiment, the alloy is thermomechanically treated nickel-titanium alloy

In an embodiment, the irrigant is at least one of saline water and sodium hypochlorite. In a preferred embodiment, the irrigant is sodium hypochlorite. In a preferred embodiment, the concentration of sodium hypochlorite is in the range of 0.5% to 6%.

In an embodiment, the irrigant is heated to at least 60° C. prior to injecting in the canal of the tooth from which the endodontic separated instrument is to be removed.

BRIEF DESCRIPTION OF THE DRAWINGS

The subject matter that is regarded as the invention is particularly pointed out and distinctly claimed in the claims at the conclusion of the specification. The following drawings form part of the present specification and are included to further demonstrate certain aspects of the present invention, the inventions of which can be better understood by reference to one or more of these drawings in combination with the detailed description of specific embodiments presented herein. The foregoing and other aspects, features, and advantages of the invention are apparent from the following detailed description taken in conjunction with the accompanying drawings in which:

DETAILED DESCRIPTION OF THE INVENTION

Figure 1A:
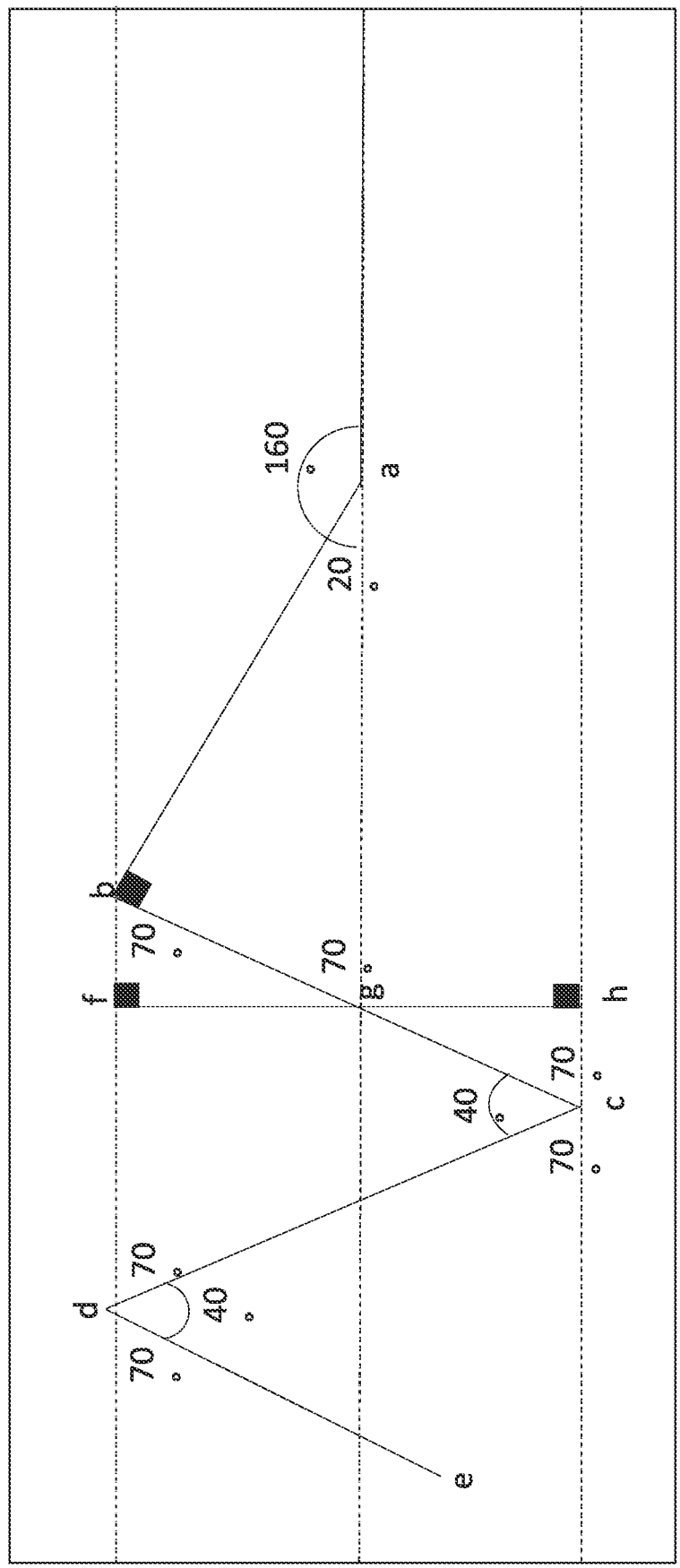
FIG. 1A illustrates the method for preparing the needle.

The proposed invention aims to provide for an extractor needle, which can be deformed as per the canal morphology thus resulting in effective extraction of broken endodontic instruments from the root canal of the tooth. The terminal tip of the extractor needle that is inserted into the root canal of the tooth, is fabricated with a thermomechanically treated nickel-titanium alloy, said alloy having a crystalline structure, which shows different properties in different phases, thereby allowing the needle to take the specific shape of the canal from which the broken endodontic instrument is to be removed.

The aim of the present invention is therefore to provide for a needle that exhibits shape memory effect when inserted into the root canal and possesses super elasticity during preparation. The reversing properties at different phases gives the needle a unique clinical property in the field of endodontics.

The present invention also provides for a tip fabricated with a thermomechanically treated nickel-titanium alloy, which can take the specific shape of the canal from which the endodontic separated instrument is to be removed.

In one aspect, the present invention is directed to extracting endodontic separated instruments, which are embedded in the canal of the tooth. The endodontic extractor needle comprises an elongate shaft having at the upper end a gripping handle portion and a terminal tip which is inserted within a root canal of a tooth. The elongate shaft of the needle has a length such that the gripping handle portion extends outside the tooth when the terminal tip of the needle is inserted within the root canal. The thickness of the terminal tip is increases towards the upper end of the needle towards the griping handle portion.

The terminal tip of the needle has a diameter, which is slightly greater than the cross-sectional dimension (diameter) of the endodontic separated instrument. The term "diameter" is to be understood in a general sense and for convenience is used to describe the cross-sectional dimension of the needle and the endodontic separated instrument. The terminal tip of the needle has a diameter in the range of 0.25 mm-1 mm. Further the thickness of the needle is 0.2 mm for the terminal 3 mm and gradually increases to become 0.35 mm at a point 5 mm far from the tip and continues 0.35 mm for along the needle. It must be noted, that the aim of having a small diameter is to preserve tooth structure. A needle with big diameter will not be able to be inserted in the root canal unless the canal is widely prepared. The extra preparation of the canal would consume removal of tooth material and weaken the root.

The terminal tip of the needle can be fabricated with a shape memory alloy such as nickel-titanium alloy or a shape memory polymer such as VERI FLEX. More specifically, the shape memory alloy used to fabricate the needle is thermomechanically treated. In particular, the alloy is thermomechanically treated nickel-titanium alloy. The thermomechanically treated nickel-titanium alloy is both a Martensite-Austenite alloy and combines both shape memory and super-elasticity in clinical application. The main feature of this alloy is that it has a crystalline structure, which is temperature dependent and possesses different properties at different temperatures, thereby allowing the needle to take the specific shape of the canal from which the endodontic separated instrument is to be removed. This alloy gives the needle elasticity and flexibility to adapt to the canal irregularities from which the endodontic separated instrument is to be removed. The thermomechanically treated nickel-titanium alloy comprises nickel and titanium in an equiatomic ratio.

In the Martensite phase (room temperature), the alloy is soft, ductile, and flexible and displays high plasticity. In the Austenite phase (intracanal temperature), the alloy is hard, less flexible and super-elastic. Since the needle in the Martensitic phase displays high plasticity, the same can be deformed as per the curvature of the canal prior to insertion.

The term "room temperature" is to be understood in its general sense and for convenience is any temperature which is 25° C. or less.

The term "intracanal temperature" is to be understood in its general sense and for convenience is same as the body temperature, which in a normal case should be at least 37° C.

The needle fabricated with the aforementioned alloy is completely straight at room temperature or in the Martensitic phase (25° C. or less) and becomes curved when exposed to intracanal temperature or in the Austenitic phase (37° C. or more) due to a phase transformation from the Martensite-Austenite phase. This change in shape is mainly due the unique property of the thermomechanically treated alloy with which the needle is fabricated. Because of this transformation in shape, the needle of the present invention effectively grips broken endodontic instruments from curved canals.

The terminal tip of the needle is formed from the shape memory alloy. The thermomechanically treated alloy used for fabricating the needle is in particular, the MaxWire® alloy manufactured by FKG Dentaire SA.

According to another aspect, the present invention is directed to a tip for extracting an endodontic separated instrument from a canal of a tooth, wherein the tip is fabricated with a temperature-sensitive alloy; and wherein the said tip takes a specific shape of the canal from which the separated endodontic instrument is to be removed when the tip is inserted inside the canal.

According to another aspect, the present invention is also directed to a method for removing an endodontic separated instrument, which is lodged within a root canal. The method comprises selecting the appropriately sized endodontic extractor needle having a diameter slightly larger than the diameter of the broken endodontic separated instrument to be removed.

Once the appropriate needle is selected, the part of the canal coronal to the endodontic separated instrument is enlarged to at least 0.70 mm. Enlarging the canal can be achieved in various ways. In the present invention, the canal coronal to the separate endodontic instruments is enlarged to a funnel like shape using a size 2 Gates-Gildden bur or any size 70 Rotary Instrument used with a brush motion. The canal is enlarged to allow for proper visualization of the endodontic separated instrument.

Subsequently, the upper end of the broken endodontic instrument is exposed using an ultrasonic tip or an endosonic file. Commonly used ultrasonic tips in endodontic treatments are CPR, Obtura-Spartan Corp, Fenton Mo. In some cases, the endodontic separated instrument is lodged deep within the root structure of the canal. In such scenarios, a coring tool may be used to clean out and expose the upper end of the expose the length of the upper end of the endodontic separated instrument. At least 2-3 mm of the broken endodontic instrument is to be exposed for efficient removal.

The terminal end of the needle is then inserted and placed around the exposed tip of the endodontic separated instrument. If the broken endodontic instrument is lodged in a curved canal, the shape of the terminal tip of the needle is modified to follow the curvature of the canal, prior to insertion. This modification in the shape of the tip of the needle can easily be achieved, as the needle is fabricated with an alloy that exhibits high plasticity at room temperature or in the Martensitic phase and hence can be easily deformed as per the curvature of the canal.

Once in place, the needle is connected to a syringe and a hot irrigant is injected into the canal of the tooth via the syringe. The hot irrigant used during the procedure is at least one of saline water or sodium hypochlorite. Preferably, the hot irrigant used is 0.5% by weight to 6% by weight of sodium hypochlorite.

Because of the change in temperature, the terminal tip of the needle transforms from the Martensitic phase to the Austenitic phase. Because of exposure to heat, the straight shape of the needle transforms to a specific curved shape thereby securely engaging the upper end of endodontic separated instrument. As a result, the needle is able to tightly engage the endodontic separated instrument. The needle along with the gripped endodontic instrument is then pulled and/or twisted out to remove both the needle and the endodontic separated instrument from the root canal of the tooth. For endodontic instruments, which were broken through clockwise rotation, the needle can be rotated counter clockwise prior to withdrawal, and vice versa.

In another aspect of the present invention, there is also provided a kit, which includes multiple needles of different diameters. Such a kit may include three or more differently sized extractor tools to extract broken endodontic instruments of different diameters.

It is therefore an object of the present invention to provide for an extractor needle fabricated with a thermomechanically treated shape memory alloy allowing the needle to change its shape as per the curvature of the canal from which the endodontic separated instrument is to be removed. Further, since the shape of the needle can be modified as per the curvature of the canal prior to insertion, the same needle can be used to retrieve endodontic separated instruments of different diameters.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

EXAMPLES

Preparation of the Needle

A wire will be used as a core to build up the needle. The diameter of the core represents the internal diameter of the extractor needle. Large variety of materials can be used to fabricate this core. Elastic (with shape memory) alloy (e.g., nickel-titanium) or polymer (e.g., VERI-FLEX) are preferred as they can be used repeatedly. The terminal end of the core will be fabricated in a specific snake-shape with respect to angles as illustrated in FIG. 1A.

As illustrated in FIG. 1A, to prepare the snake-shape figure, the core is bent 160° at point (a) which is 3 mm far from the tip. Next, the wire is bent 90° at point (b) which is 1 mm far from point (a). so, the length of [ab] is determined to be 1 mm. The wire is bent again at (c). (c) point is located at a level so that the vertical dimension between (c) and the core axis equals the vertical dimension between (b) and the core axis (i.e. [fg]=[gh]). Based on the trigonometric equations and laws, the following lengths can be calculated:

[ab]=1 mm (proposed)
[bc]=0.7 mm
[cd]=0.7 mm
[de]=0.6
The angle gab=20° (proposed)
The angle bga=70° (because abg is a triangle)
The angle fbc=70° (equals the angle bga, alternate interior angles)
The angle bdc=70° (equals the angle dbc and dbc is an isosceles triangle)
The angle bcd=40° (bcd is a triangle)
The angle cde=40° (equals the angle bcd as proposed)
The angle gch=70° (equals the angle fbg, alternate interior angles)
[bc]=0.7 mm Note that [bc]=[bg]+[gc]=2[bg]=2·tan(20)=0.72
[cd]=[bc] (bcd is an isosceles triangle)
[de]=0.6 because [ae]=3 mm in the straight wire $$[de] = 3 - ([ab] + [bc] + [cd])$$
$$= 3 - (1 + 0.7 + 0.7)$$
$$= 0.6 \text{ mm}$$

The alloy sheets are heated, folded and adapted around the core of the needle using machines. The resulting tubes should be at Austenite phase for temperature above 35° C. Subsequently, the walls of the tubes will be cut and polished to the final determined thickness. The suggested wall thickness is 0.20 for the terminal tip of the needle, which is to be inserted in the root canal of the tooth. The thickness gradually is increased to 0.35 for the upper part of the needle. The needle now fabricated with the thermomechanically treated nickel-titanium alloy is then cooled, straightened and cut to the final determined length. The suggested lengths for the needle are 21, 25 and 31 mm.

Exemplary Needle for Removal of Endodontic Separated Instrument

Figure 1B:
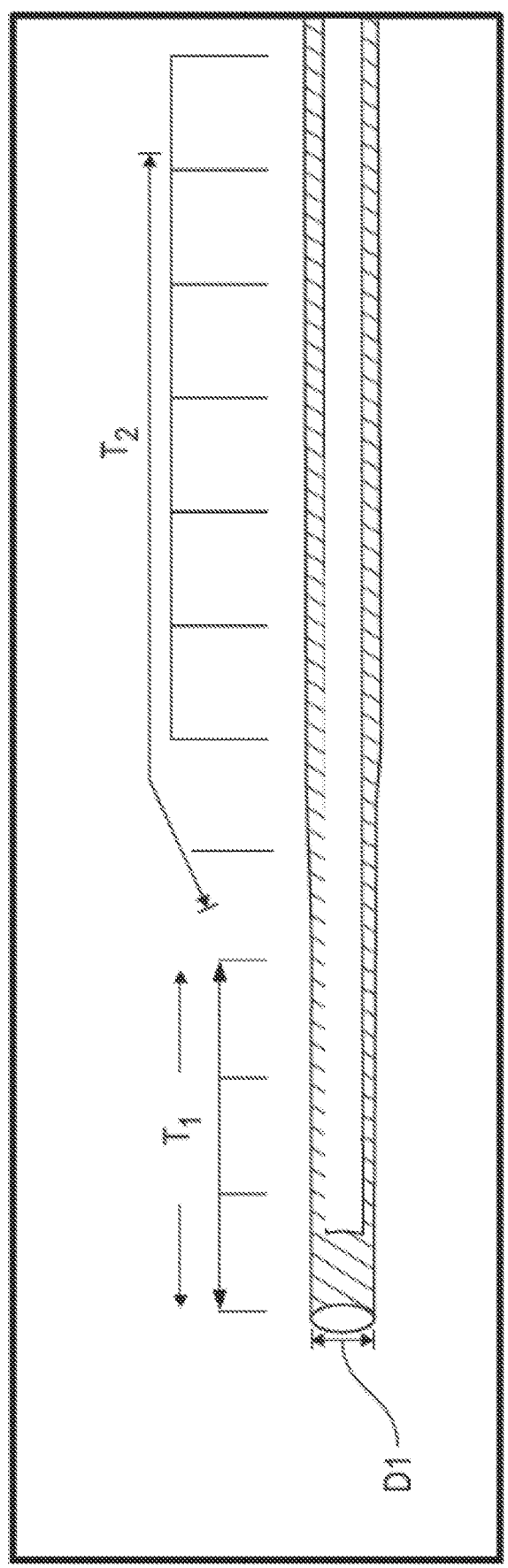
FIG. 1B illustrates the dimensions of the needle.

FIG. 1B illustrates the dimensions of the needle (100) having a tip diameter (D1) in the range of 0.25 mm-1 mm. In addition the thickness of the wall of the needle (100) is 0.2 mm for the terminal portion (T1) and is increased gradually become 0.35 mm for the latter portion (T2) of the needle (100)

Figure 1C:
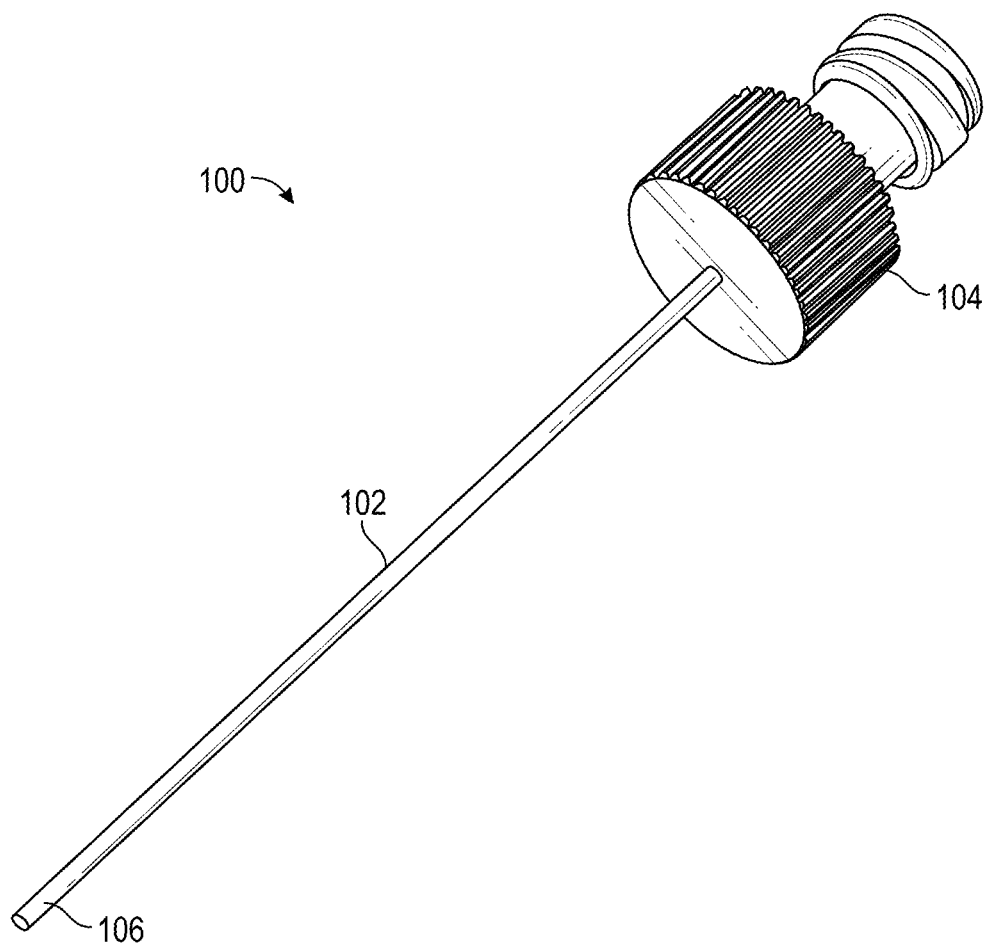
FIG. 1C illustrates a perspective view of the needle in the Martensite phase.
Figure 1D:
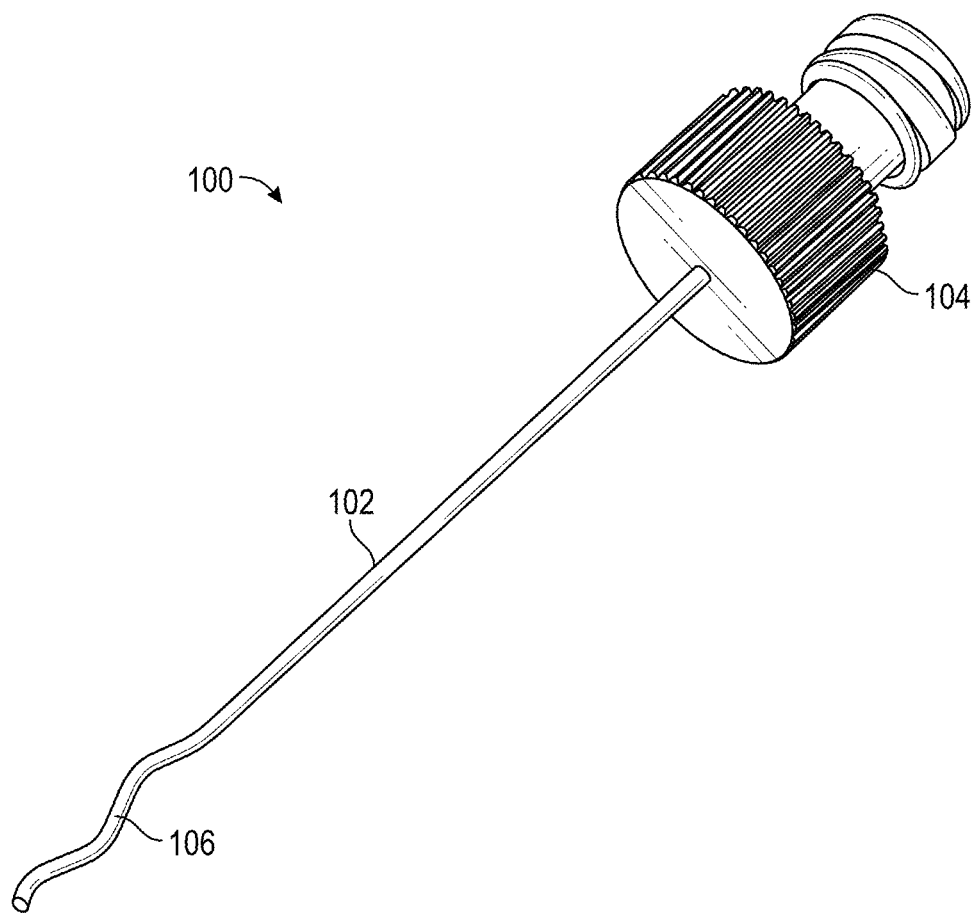
FIG. 1D illustrates a perspective view of the needle in the Austenite phase.

FIG. 1C-1D illustrates a perspective view of the needle (100) in the Martensite and the Austenite phase respectively. The needle (100) includes an elongate shaft (102) having a gripping handle portion (104) and a terminal tip (106). The length of the elongate shaft (102) is preferably 21, 25 and 31 mm so that the gripping handle portion (104) remains outside when the terminal tip (106) of the needle (100) is inserted in the canal of a tooth. The diameter of the terminal tip (106) is slightly larger than the endodontic instrument to be removed. The diameter of the terminal tip needle (100) is in the range of 0.25-1 mm.

The terminal tip (106) of the needle (100) is fabricated with a thermomechanically treated nickel-titanium alloy that exhibits both shape-memory and super-elasticity. The thermomechanically treated alloy is a Martensite-Austenite alloy with unique crystalline structure capable of having different configurations at different temperatures.

In the Martensite phase or at room temperature of 25° C. or less, the terminal tip (106) of the needle (100) is straight as illustrated in FIG. 1B. In the Martensitic phase, the alloy displays high plasticity, because of which the needle (100) can be deformed as per the curvature of the canal prior to insertion.

When the terminal tip (106) of the needle (100) is exposed to body temperature, the shape of the terminal tip of the needle changes to a specific curved shape because of phase transformation from the Martensite-Austenite phase. FIG. 1C illustrates a perspective view of needle (100) wherein the terminal tip (106) of the needle (100) has a curved shape.

Figure 2A:
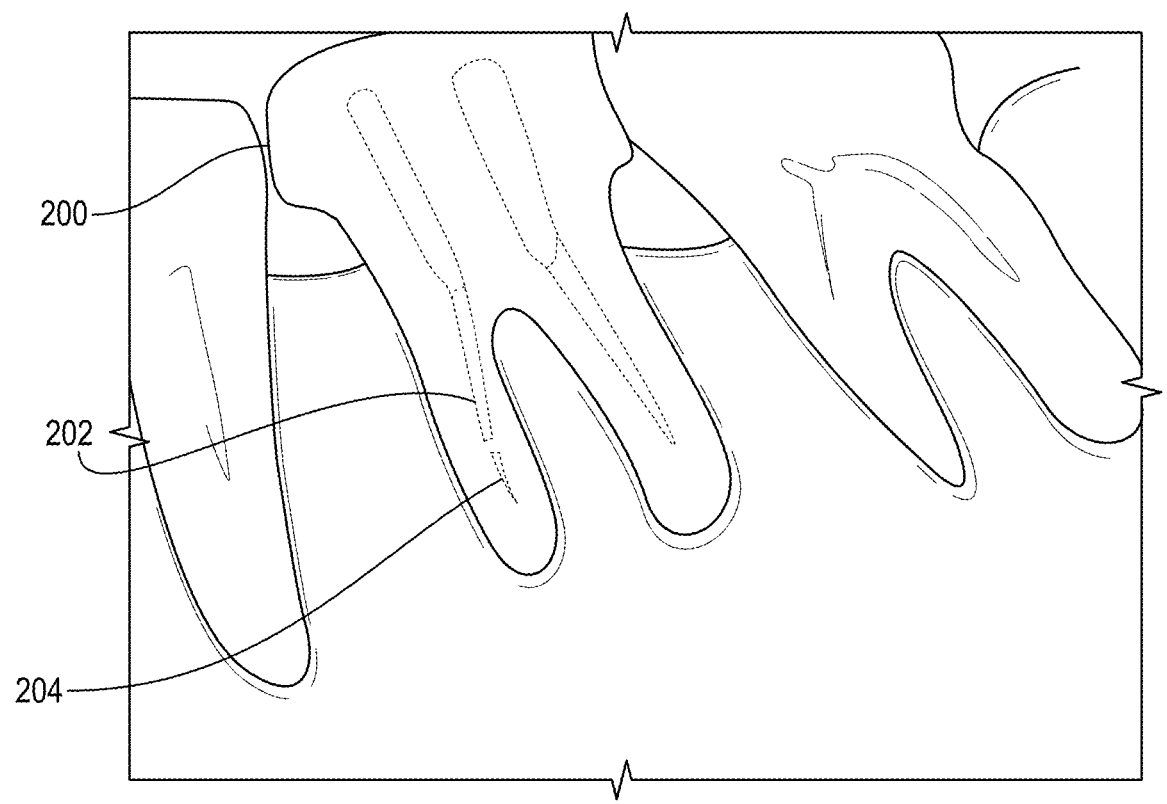
FIG. 2A illustrates a root canal of a tooth within which an endodontic instrument has broken and become lodged within the canal of the tooth.

Exemplary Method for Removal of Endodontic Separated Instruments from Root Canal of a Tooth FIG. 2A illustrates a tooth (200) having a root canal (202) in which a broken endodontic instrument (204) has been lodged within the root structure surrounding the root canal (202).

Figure 2B:
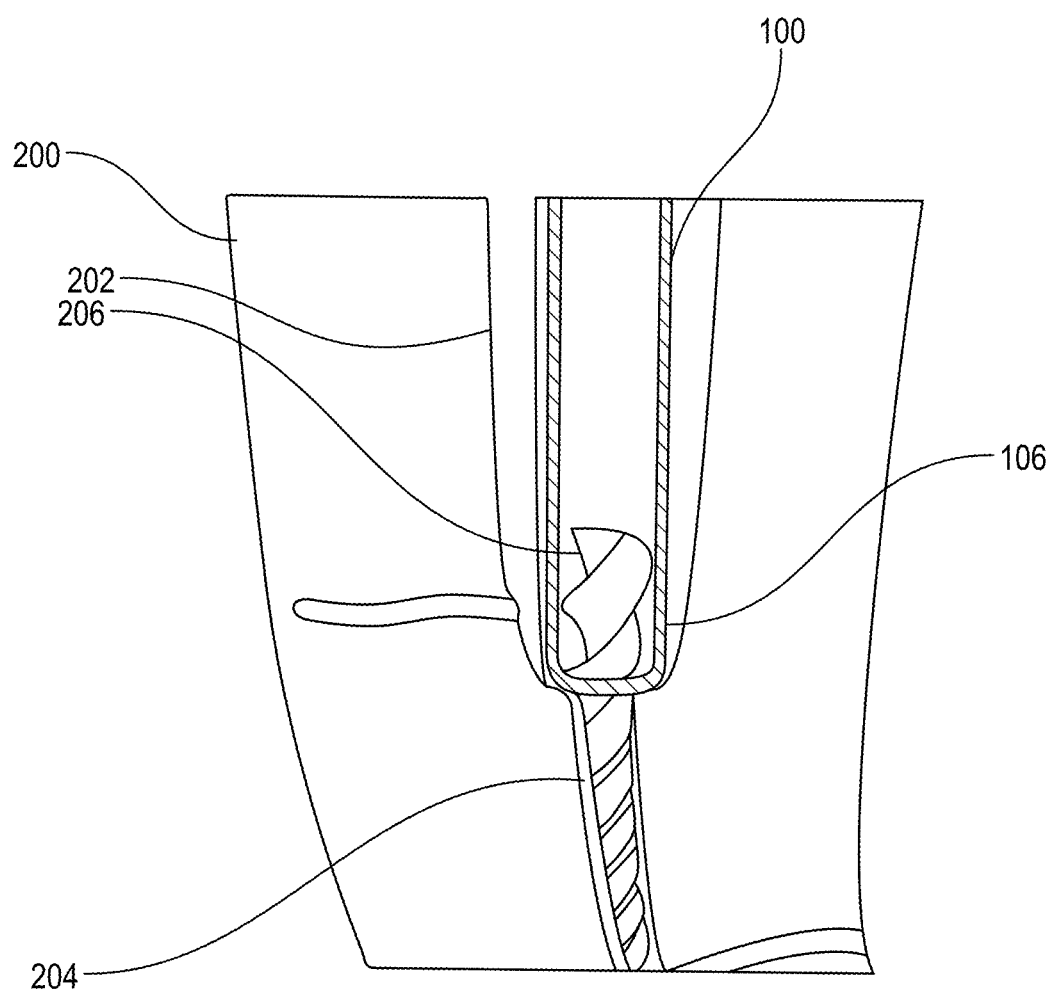
FIG. 2B illustrates a needle inserted within the root canal of a tooth to engage the upper end of the endodontic separated instrument.

As illustrated in FIG. 2B, the upper end (206) of the broken endodontic instrument (204) has been exposed using an ultrasonic tip. The needle (100) is inserted within the root canal (202) so that the terminal tip (106) of the needle (100) receives the upper end (206) of the broken endodontic instrument (204). The terminal tip (106) of the needle (100) is fabricated with a thermomechanically treated nickel-titanium alloy exhibiting both advanced shape memory and super elasticity. The unique feature of this alloy is that it possesses a crystalline structure, which is temperature dependent and shows different properties at different phases. As a result, of fabrication with the aforementioned alloy, the terminal tip (106) of the needle (100) takes the shape of the curvature of the root canal (202) from which the endodontic separated instrument (204) is to be removed. The terminal tip (106) of the needle (100) is formed from the thermomechanically treated alloy preferably a thermomechanically treated nickel-titanium alloy. During the manufacture of the needle (100), the terminal tip (106) of the needle (100) is physically deformed to stretch and expand the internal diameter of the terminal tip (106) of the needle (100). This procedure is performed at room temperature or below (Martensitic phase). The internal diameter of the terminal tip (106) maintains an expanded configuration until heated to a higher temperature, which causes the terminal tip (106) of the needle to return to its original unexpanded configuration (Austenitic phase).

Figure 2C:
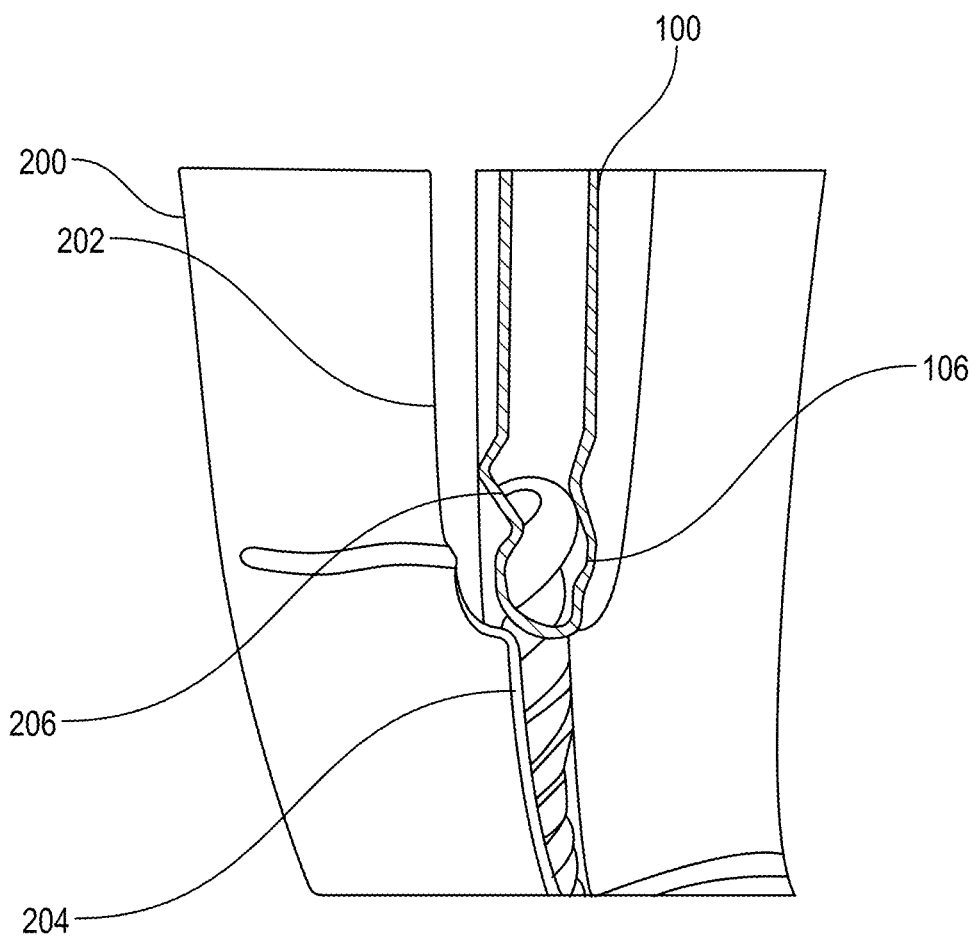
FIG. 2C illustrates the terminal tip of the needle having been heated by a hot irrigant, so as to assume a curved snake-like shape, such that the endodontic separated instrument is securely gripped within the terminal tip of the needle.
Figure 2D:
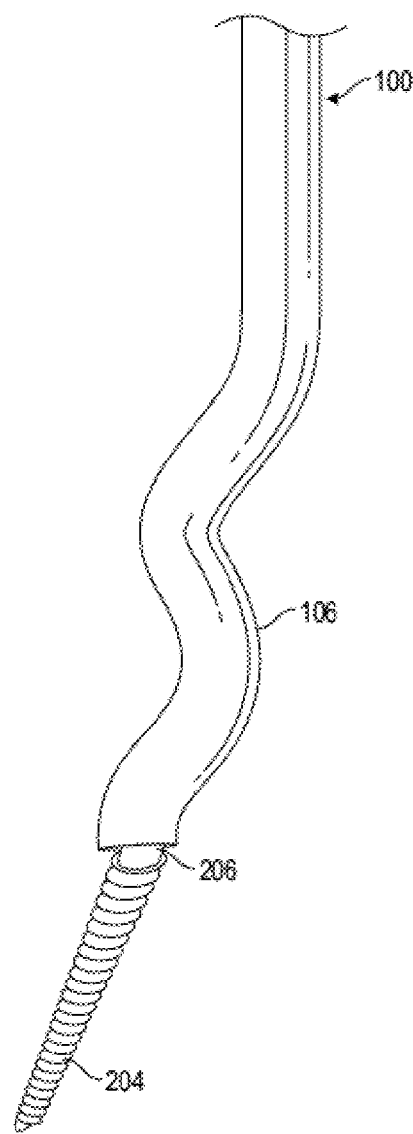
FIG. 2D illustrates the needle and the endodontic separated instrument being removed together from the root canal of the tooth.

As illustrated in FIG. 2C, the terminal tip (106) of the needle (100) is heated by injecting a hot irrigant. The hot irrigant can be either saline water or sodium hypochlorite. Sodium hypochlorite is preferred in a concentration of 0.5% -6% by weight. The irrigant is heated to a temperature of at least 60° C. Because of the heat, the terminal tip (106) of the needle (100) fabricated with the thermomechanically treated nickel-titanium alloy transforms into a curved, snake like shape because of the transformation from the Martensitic to the Austenitic phase. The terminal tip (106) of the needle (100) returns to its original unexpanded configuration, thereby securely engaging the upper end (206) of the broken endodontic instrument (204).

Because of the tight grip upon the upper end (206) of the endodontic separated instrument (204), it is possible to remove the needle (100) along with the endodontic separated instrument (204) as illustrated in FIG. 4D. As the endodontic separated instrument (204) is lodged deep within the root canal (202), it may be required to twist the needle (100) and the endodontic separated instrument (204) in the opposite direction as used to effectively remove it from the root canal (202) of the tooth (200).

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

The invention claimed is:

1. A needle tip for extracting an endodontic separated instrument from
a root canal of a tooth, the needle tip comprising:
a temperature- sensitive alloy forming at least a portion of the needle tip,
wherein said needle tip takes a curved snake-like shape in the root canal from which the endodontic separated instrument is to be removed when the needle tip is inserted inside the root canal, and
wherein said needle tip is adapted to change shape to become the curved snake-like shape at a body temperature of 37° C. or more and adapted to change shape to become straight at a room temperature of 25° C. or less.

2. The needle tip as claimed in claim 1, wherein the temperature-sensitive alloy is thermomechanically treated.

3. The needle tip as claimed in claim 1, wherein the temperature-sensitive alloy is a thermomechanically treated nickel-titanium alloy.

4. The needle tip as claimed in claim 1, wherein the needle tip has a dimeter in the range of 0.25 mm- 11 mm.

5. A needle for extracting an endodontic separated instrument from a root canal of a tooth, the needle comprising:
a gripping handle portion;
a terminal tip being insertable within the root canal of the tooth;
wherein the terminal tip is fabricated with a temperature sensitive alloy;
wherein the terminal tip takes a snake-like shape in the root canal from which the endodontic separated instrument is to be removed, and
wherein said terminal tip is adapted to change shape to become snake-like at a body temperature of 37° C. or more and adapted to change shape to become straight at a room temperature of 25° C. or less.

6. The needle as claimed in claim 5, wherein the terminal tip of the needle has a diameter greater than the diameter of the separated endodontic instrument.

7. The needle as claimed in claim 6, wherein the terminal tip of the needle has a dimeter in the range of 0.25 mm-1 mm.

8. The needle as claimed in claim 5, wherein the temperature sensitive alloy is thermomechanically treated.

9. The needle as claimed in claim 8, wherein the temperature sensitive alloy is thermomechanically treated nickel- titanium alloy.

10. A method for extracting an endodontic separated instrument from a root canal of a tooth, the method comprising:
enlarging the root canal coronal to the endodontic separated instrument;
exposing the upper end of the endodontic separated instrument using an ultrasonic tip;
inserting the terminal tip of a needle fabricated with a temperature- sensitive alloy into the root canal of the tooth to engage the upper end of the endodontic separated instrument while the needle tip has a straight shape;
injecting a hot irrigant in the root canal of the tooth causing the terminal tip of said needle to change to a snake-like shape thereby securely engaging the upper end of the separated instrument; and
removing the endodontic separated instrument along with the needle from the root canal of the tooth.

11. The method as claimed in claim 10, wherein the temperature-sensitive alloy is thermomechanically treated.

12. The method as claimed in claim 11, wherein the temperature-sensitive alloy is thermomechanically treated nickel- titanium alloy.

13. The method as claimed in claim 10, wherein the irrigant is at least one of saline water and sodium hypochlorite.

14. The method as claimed in claim 13, wherein the irrigant is sodium hypochlorite.

15. The method as claimed claim 14, wherein the concentration of sodium hypochlorite is in the range of 0.5% to 6%.

16. The method as claimed in claim 10, wherein the irrigant is heated to at least 60° C. prior to injecting in the root canal of the tooth.

* * * * *